(12) United States Patent
Tung (10) Patent No.: US 9,820,439 B1
(45) Date of Patent: Nov. 21, 2017

(54) PARTICLE COLLECTING DEVICE

(71) Applicant: SHEN YU PLASTIC CO., LTD., Taichung (TW)

(72) Inventor: Hsiu-Chuan Tung, Taichung (TW)

(73) Assignee: SHEN YU PLASTIC CO., LTD., Taichung (TW)

( * ) Notice: Subject to any disclaimer, the term of this patent is extended or adjusted under 35 U.S.C. 154(b) by 0 days.

(21) Appl. No.: 15/610,623

(22) Filed: Jun. 1, 2017

(51) Int. Cl.
*A01D 51/00* (2006.01)
*A47L 13/00* (2006.01)
*A63B 47/02* (2006.01)

(52) U.S. Cl.
CPC ............ *A01D 51/002* (2013.01); *A47L 13/00* (2013.01); *A63B 47/02* (2013.01)

(58) Field of Classification Search
CPC .... A63B 47/024; A63B 47/021; A01D 51/002
See application file for complete search history.

(56) References Cited

U.S. PATENT DOCUMENTS

| | | | | | |
|---|---|---|---|---|---|
| 2,718,745 | A | * | 9/1955 | Scafidi | A01D 51/002 294/19.2 |
| 3,215,293 | A | * | 11/1965 | Kelly | A63B 47/021 294/19.2 |
| 3,227,298 | A | * | 1/1966 | Shoemaker | A63B 47/021 294/19.2 |
| 3,604,190 | A | * | 9/1971 | Wray | A01D 51/002 294/19.2 |
| 3,804,449 | A | * | 4/1974 | Falitz | A63B 47/021 294/19.2 |
| 3,902,749 | A | * | 9/1975 | Falitz | A63B 47/021 294/19.2 |
| 3,926,465 | A | * | 12/1975 | Hoagland | A63B 47/02 294/19.2 |
| 4,322,939 | A | * | 4/1982 | McDonald | A01D 51/002 294/19.2 |
| 5,407,242 | A | * | 4/1995 | Beranek | A63B 47/021 294/19.2 |
| 6,422,621 | B1 | * | 7/2002 | Tandlich | A63B 47/021 294/19.2 |
| 6,460,249 | B1 | | 10/2002 | Holt, Jr. | |
| 2012/0279194 | A1 | | 11/2012 | Pope | |
| 2014/0161574 | A1 | | 6/2014 | Pope | |
| 2017/0000029 | A1 | | 1/2017 | Pope | |

FOREIGN PATENT DOCUMENTS

WO   WO 2016/150519 A1 * 9/2016 ............. A01D 51/00

* cited by examiner

*Primary Examiner* — Jonathan Snelting
(74) *Attorney, Agent, or Firm* — Pai Patent & Trademark Law Firm; Chao-Chang David Pai (57) ABSTRACT

A particle connecting device includes a cage having a hub and a cover on each of two ends thereof. A handle is pivotably connected between the two covers and the two hubs. The cage is composed of multiple resilient wires which are bow-shaped, and the two ends of the resilient wires are respectively connected to two end pieces. Each hub includes pivotal portions which are pivotably connected to the corresponding end piece. The pivotal portions each include a hook to hook the cover. A shaft extends through the center of each of the hub and cover, and is pivotably connected to a respective lug of the handle in axial and radial directions.

7 Claims, 9 Drawing Sheets

PARTICLE COLLECTING DEVICE

BACKGROUND OF THE INVENTION

1. Fields of the Invention

The present invention relates to a ball-like cage which rolls on the ground to collect particles, debris or the like.

2. Descriptions of Related Art

The conventional tools for cleaning floors or ground are brooms or rakes which are used to gather particles as a pile, and then collect the particles into a garbage bag or a dustpan. However, for those particles such as seeds, fruits, beans, plastic balls or the like, it's difficult to use the conventional tools to collect the gathered.

A nut gatherer device is disclosed in US 2012/0279194A1, US 2014/0161574A1 and US 2017/0000029A1, and comprises a rotatable cage with two hubs on two ends of the cage. A handle is connected between the two hubs and has a handle extension for the user to hold. The cage rolls on the ground, and the nuts are collected into the cage by resilient wires of the cage. By separating the adjacent resilient wires to form a large opening, the nuts can be removed from the cage through the opening.

Each of said hubs comprises a hub disc coupled with a co-axial hubcap. The end portions of the wires are inserted into the recesses and holes of the hub disc. The hubcap is connected to the hub by one or multiple connection members to position the wires to avoid the wires from being separated from the hub. In order to securely position the wires in the recesses and holes, the two ends of each wire have to be bent inward or outward. The wires are bow-shaped.

The hubs mentioned above includes so many recesses and holes that the hubs are weakened. When the wires are deformed due to operation, the stress applied to the hubs from the wires may break the hubs. Besides, the assembling processes of the connection between each of the wires and the hubs are complicated.

U.S. Pat. No. 6,460,249 discloses a method of making a nut harvester wherein the resilient wires are straight wires and arranged around a center, and two ends of the wires are clamped into two respective sleeves and each sleeve includes an inner sleeve and an outer sleeve. The resilient wires are clamped between the inner and outer sleeves. The two sleeves are pushed toward the center to deform the resilient wires into a bow-like configuration so as to define a chamber therein. Nevertheless, not all of the resilient wires are identically deformed to be bow shaped, those resilient wires that are not deformed as expected have to be individually adjusted. Furthermore, because the resilient wires are not permanently deformed, while the particles are being picked up by the nut harvesting device, the resilient wires can be easily bent and deformed.

SUMMARY OF THE INVENTION

The primary object of the present invention is to provide a particle collecting device which includes simplified parts and is easy to assemble. The connection between the parts are secure and the resultant cage rolls smoothly.

The particle connecting device comprises a cage having multiple connection units, and each connection unit has multiple resilient wires that are parallel to each other. Each end of the resilient wires of each connection unit is connected to an end piece which has a positioning hole.

Two hubs each have a disc which has an axial hole defined centrally therethrough. Multiple pivotal portions are formed on outside of the disc and located surrounding the axial hole. Each pivotal portion has a hook which is resiliently and radially movable relative to the disc. Each pivotal portion is inserted into the positioning hole corresponding thereto. The end pieces are connected to the two hubs. The resilient wires are arranged to form a chamber.

Two covers each have a body which has a shaft hole defined centrally therethrough. Multiple fixing holes are defined in the body and located surrounding the shaft hole. The pivotal portions are inserted into the fixing holes. Each hook hooks the periphery of the fixing hole corresponding thereto. The bodies cover up the end pieces, respectively.

A shaft extends through the axial hole of the disc and the shaft hole of the body corresponding thereto. The shaft includes a flange formed on the first end thereof which is located opposite to the hub corresponding thereto and engaged with the inside of the hub. A receiving recess is defined in the second end of each shaft. A first locking hole is defined centrally in the shaft.

A handle has a handle body and two lugs which are formed on two ends of the handle body. A handle extension extends from the central portion of the handle. The two lugs are located on two respective outsides of the covers. Each lug has a pivot extending from the inside thereof which faces the cover. The pivot is inserted into the receiving recess of the shaft corresponding thereto. The pivot has a second locking hole defined centrally therein. The second locking hole of the pivot is located corresponding to the first locking hole of the shaft. A locking member extends through the first and second locking holes to connect the lug to the shaft.

The cage of the present invention is composed of four connection units connected to the hubs. The cage having four connection units is a preferred combination. Of course, the number of the connection units can be different.

Each of the connection units of the present invention is integrally composed of multiple resilient wires and two end pieces, this avoids individually connecting each end of the resilient wires to the recesses and holes of the hub disc.

The resilient wires are pre-formed into bow-shaped wires so that when assembling the cage, the bow-shaped resilient wires do not deform unexpectedly, so as to ensure the shape of the American football-shaped (or i.e. ellipsoidal) cage and the interior of the cage.

The connection units of the cage are pivotally connected to the pivotal portions of the hubs by the positioning holes of the connection units. This allows the four connection units to be quickly connected to the hubs so as to form the cage. The structure of the assembly is simple and can be assembled quickly and firmly.

The covers position the connection units to the hubs and further ensure the stability of the assembly. The covers are used to cover and protect the hubs, the end pieces and the ends of the resilient wires. Therefore, the two ends of the cage has a simple and organized appearance.

The shaft of the present invention extends through the hubs and the cover so that the hub and the cover are rotatably mounted to the shaft and ensures the smooth rotation of the cage. The lugs of the handle of the present invention is pivotable in radial and axial direction relative to the shaft to enhance the connection therebetween, and also enhance the stability of the connection between the hubs and the covers.

The present invention will become more apparent from the following description when taken in conjunction with the accompanying drawings which show, for purposes of illustration only, a preferred embodiment in accordance with the present invention.

DETAILED DESCRIPTION OF THE PREFERRED EMBODIMENT

Figure 1:
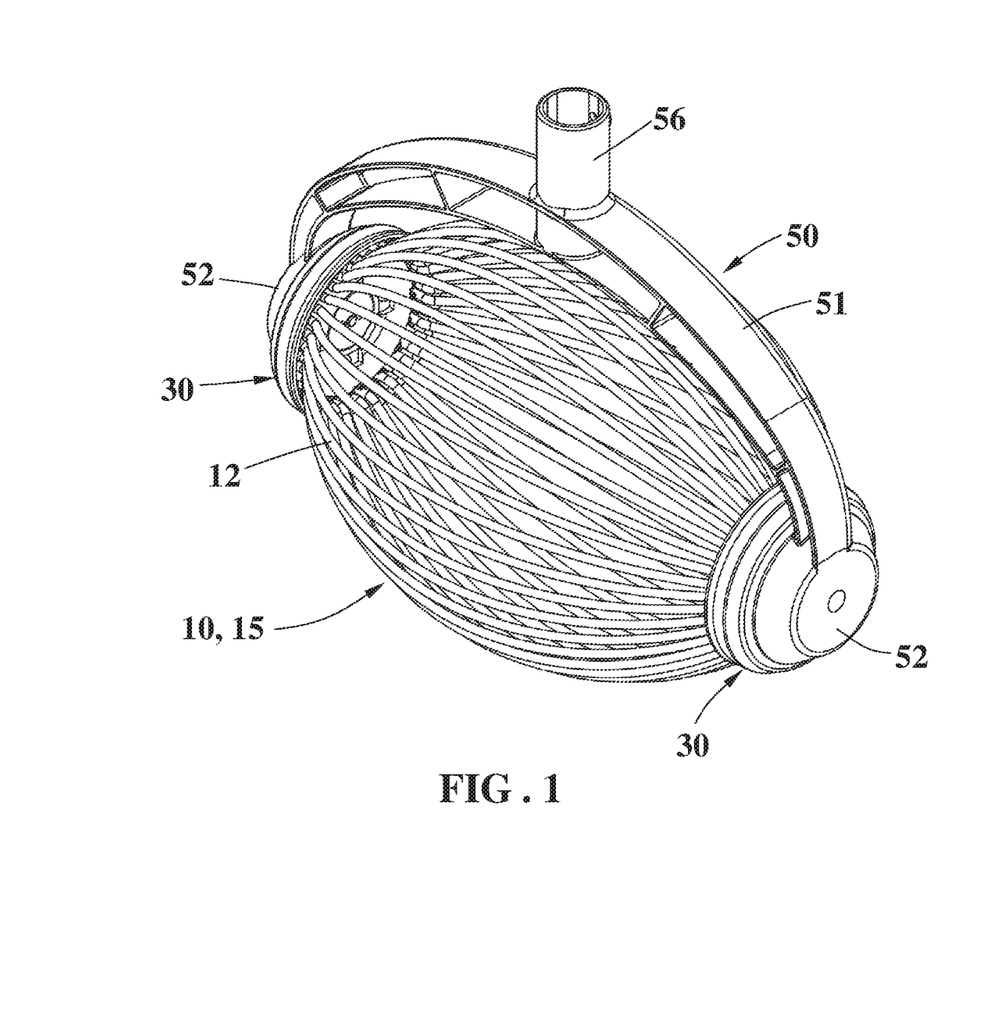
FIG. 1 is a perspective view of the particle collecting device of the present invention.
Figure 2:
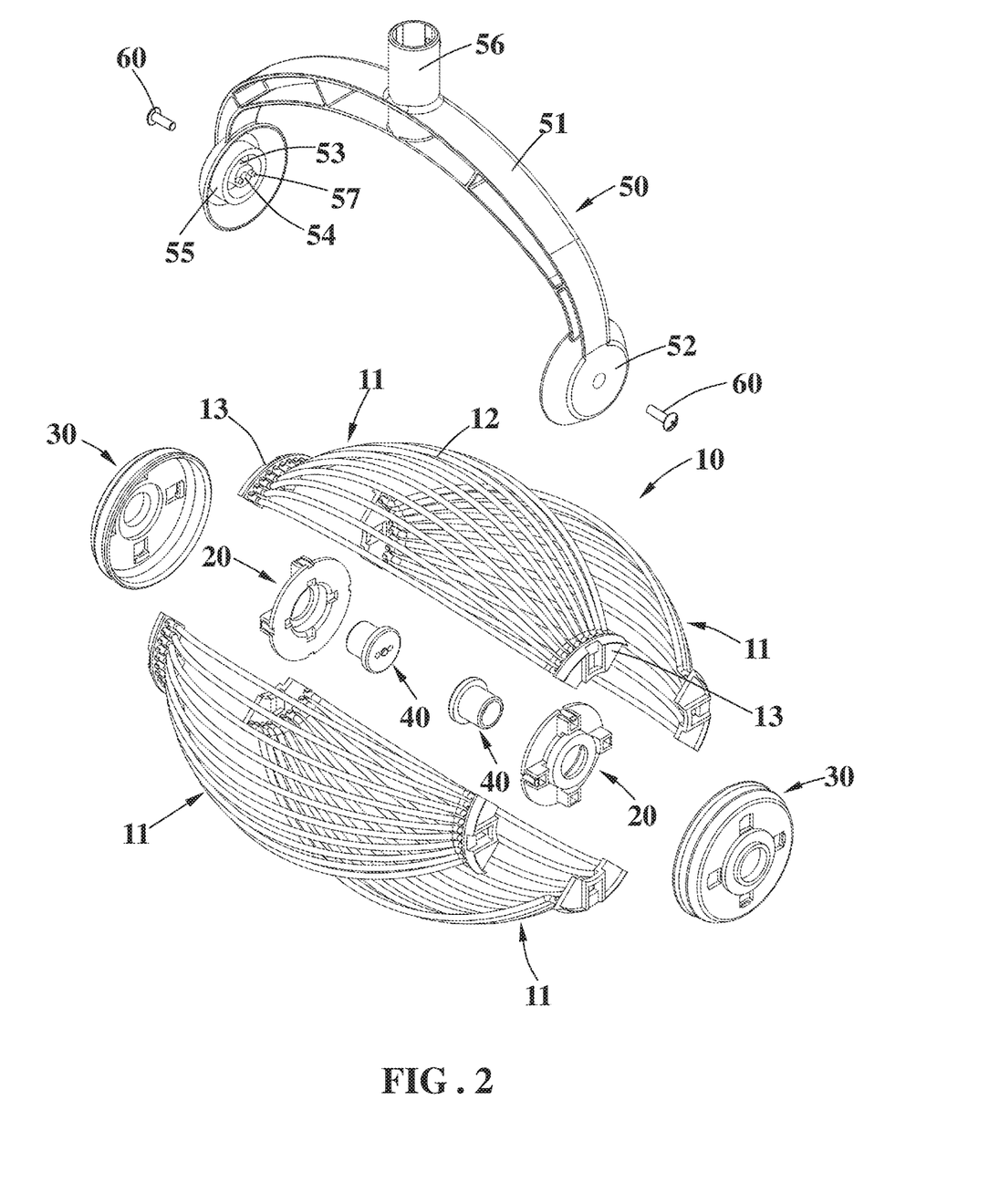
FIG. 2 is an exploded view of all of the parts of the particle collecting device of the present invention.
Figure 3:
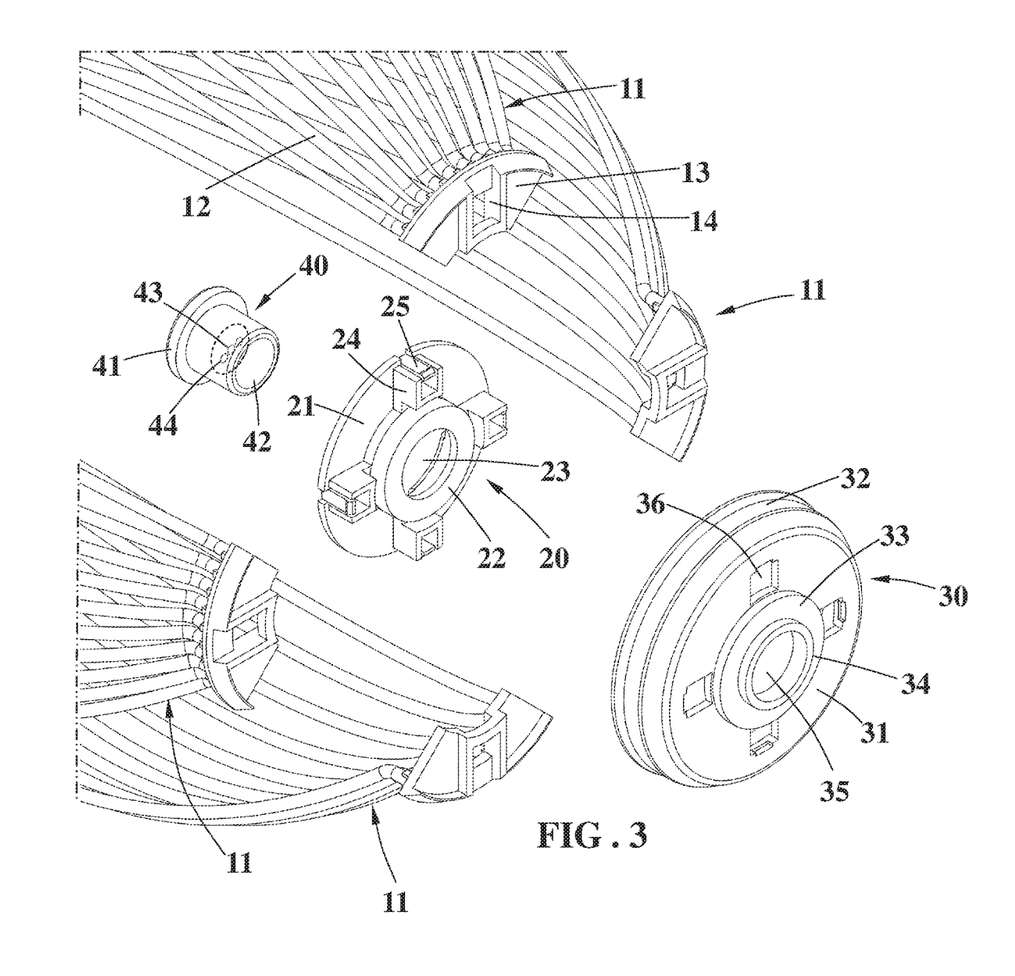
FIG. 3 is a partially enlarged view of FIG. 2.

Referring to FIGS. 1 to 3, the particle connecting device of the present invention comprises a cage 10, two hubs 20, two covers 30, two shafts 40 and a handle 50.

The cage 10 has multiple connection units 11, and each connection unit 11 has multiple resilient wires 12 that run side by side. Each end of the resilient wires 12 of each connection unit 11 is connected to an end piece 13 which has a positioning hole 14.

The two hubs 20 each have a disc 21 which has a tubular portion 22 extending from the outside thereof. An axial hole 23 is defined through the tubular portion 22. Multiple pivotal portions 24 are formed on the outside of the disc 21 and located to surround the axial hole 23. Each pivotal portion 24 is a hollow and substantially rectangular portion and has a hook 25 which is resiliently and radially movable relative to the disc 21.

Figure 4:
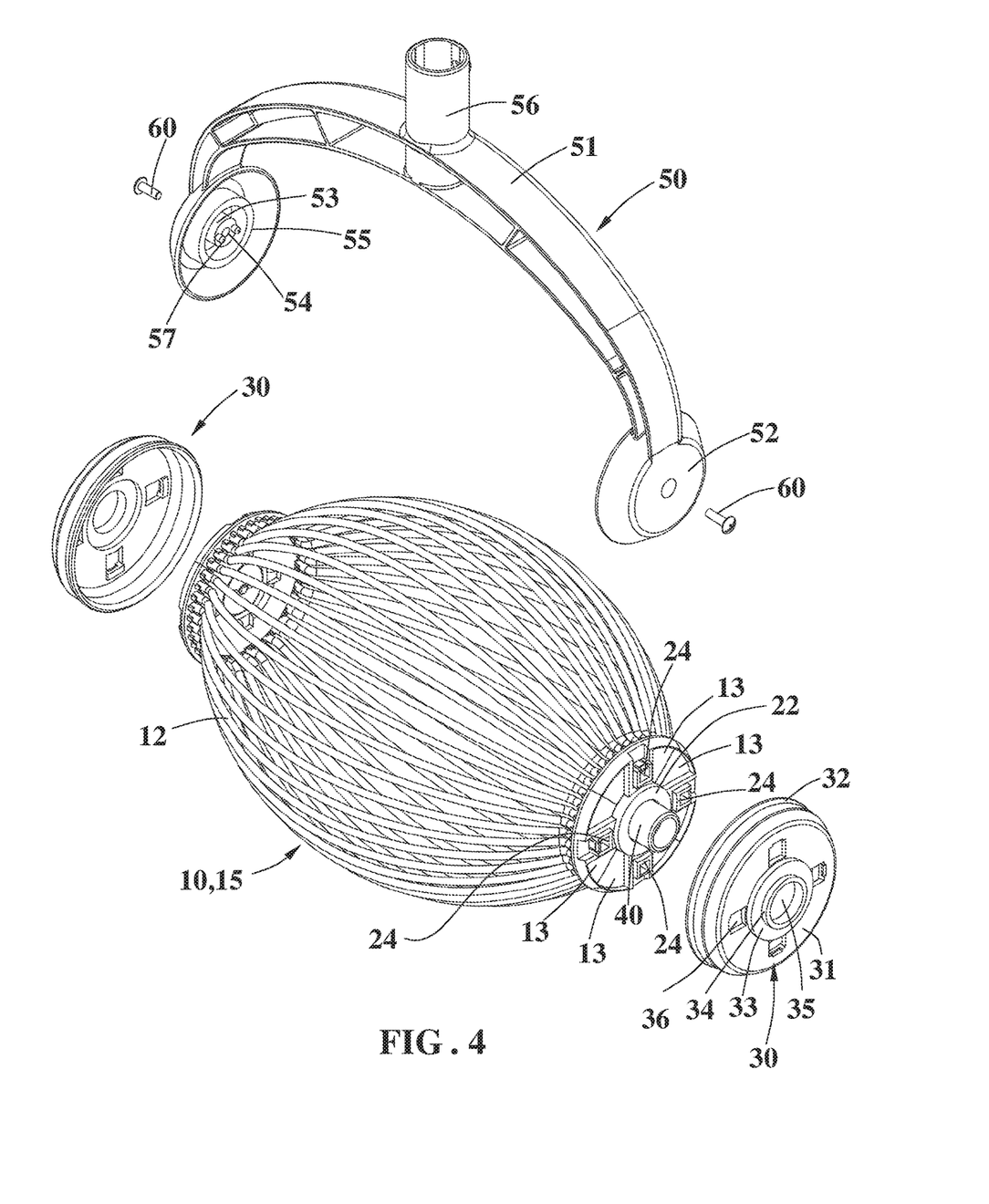
FIG. 4 is an exploded view of some of the parts of the particle collecting device of the present invention.
Figure 7:
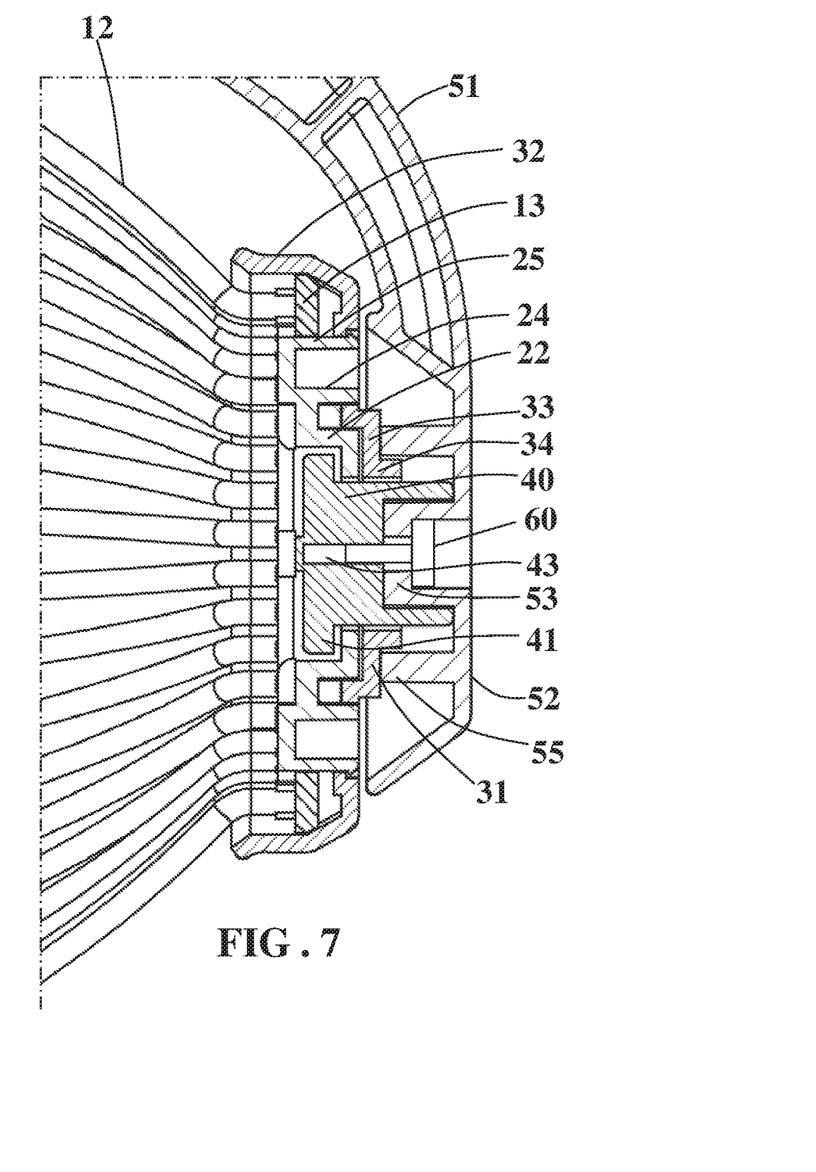
FIG. 7 is a cross sectional view, taken along line VII-VII of FIG. 6.
Figure 8:
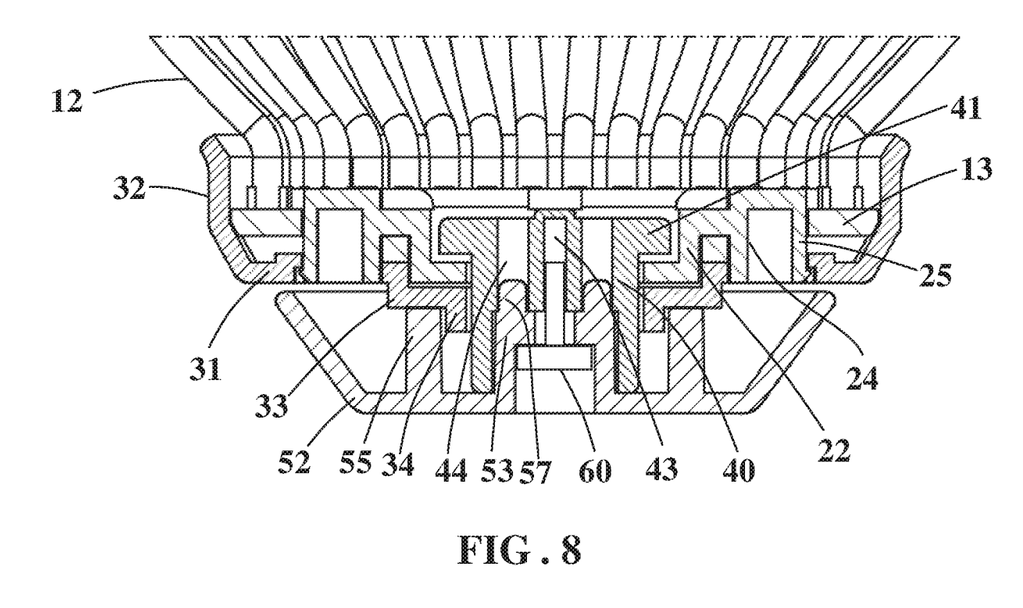
FIG. 8 is a cross sectional view, taken along line VIII-VIII of FIG. 6.

As shown in FIGS. 4, 7 and 8, each pivotal portion 24 is inserted into the positioning hole 14 corresponding thereto, and the end pieces 13 are connected to the outside of the two hubs 20. The end pieces 13 each are a fan-shaped piece, and the end pieces 13 are assembled to the hubs 20 side-by-side. The multiple resilient wires 12 are assembled to form the chamber 15 of the cage 10.

As shown in FIGS. 4, 7 and 8, the two covers 30 each have a body 31 which has a first stepped portion 33 and a second stepped portion 34 formed on the outside thereof. The outer diameter of the second stepped portion 34 is smaller than that of the first stepped portion 33. A shaft hole 35 is defined centrally through the first and second stepped portions 33, 34. Multiple fixing holes 36 are defined in the body 31 and located to surround the shaft hole 35. The cover 30 is connected to the outside of the hub 20. The pivotal portions 24 are inserted into the fixing holes 36. Each of the hooks 25 hooks the periphery of the fixing hole 36 corresponding thereto. The first stepped portion 33 of the cover 30 is engaged with the tubular portion 22 of the hub 20. The covers 30 each have a peripheral portion 32 which is connected to the outer periphery of the body 31. The peripheral portion 32 covers the periphery of the end piece 13 and the ends of the resilient wires 12.

As shown in FIGS. 3, 4, 7 and 8, the covers 30 are connected to the hubs 20, and each shaft 40 extends through the axial hole 23 of the disc 21 and the shaft hole 35 of the body 31 corresponding thereto. The shaft 40 includes a flange 41 formed on the first end thereof which is located opposite to the hub 20 corresponding thereto and engaged with the inside of the hub 20. A receiving recess 42 is defined in the second end of each shaft 40. A first locking hole 43 is defined centrally in the shaft 40.

As shown in FIGS. 1, 4, 7 and 8, the handle 50 includes a handle body 51 and two lugs 52 which are formed on two ends of the handle body 51. A handle extension 56 extends from the central portion of the handle 50 for the user to hold. The two lugs 52 are located on two respective outsides of the covers 30. Each lug 52 has a pivot 53 extending from the inside thereof which faces the cover 30. The pivot 53 is inserted into the receiving recess 42 of the shaft 40 corresponding thereto. The pivot 53 has a second locking hole 54 defined centrally therein. The second locking hole 54 of the pivot 53 is located corresponding to the first locking hole 43 of the shaft 40. A locking member 60 extends through the first and second locking holes 43, 54 to connect the lug 52 to the shaft 40.

As shown in FIGS. 4 and 7, the lugs 52 of the handle 50 each have a groove 55 defined in the inside thereof. The second stepped portion 34 is engaged with the groove 55.

As shown in FIGS. 2, 8, the shaft 40 includes two restriction recesses 44 which are parallel to the first locking hole 43 of the shaft 40. A pin 57 extends from the distal end of the pivot 53 of the lug 52, and the pin 57 is inserted into the restriction recess 44.

Figure 5:
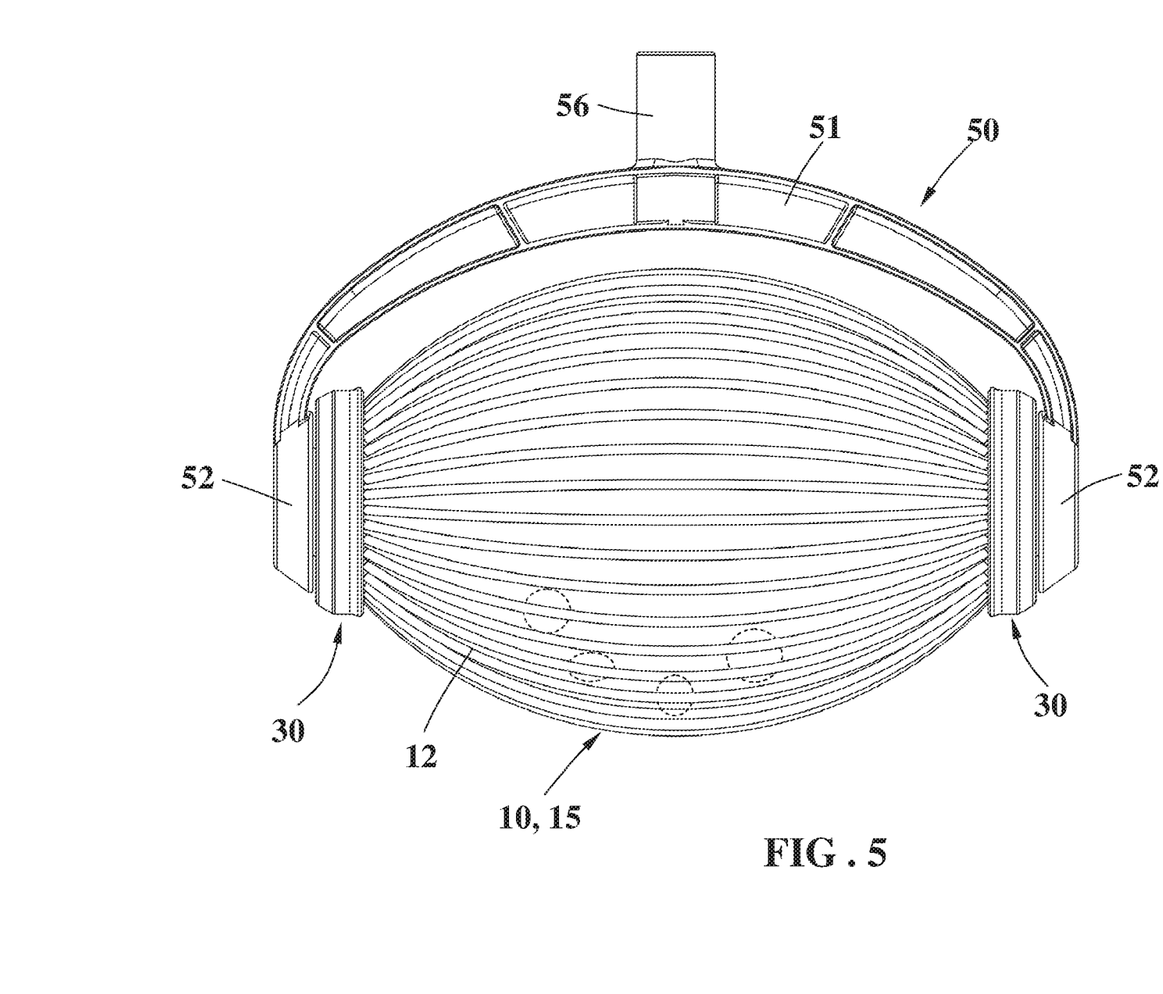
FIG. 5 is a front view of the particle collecting device of the present invention.
Figure 6:
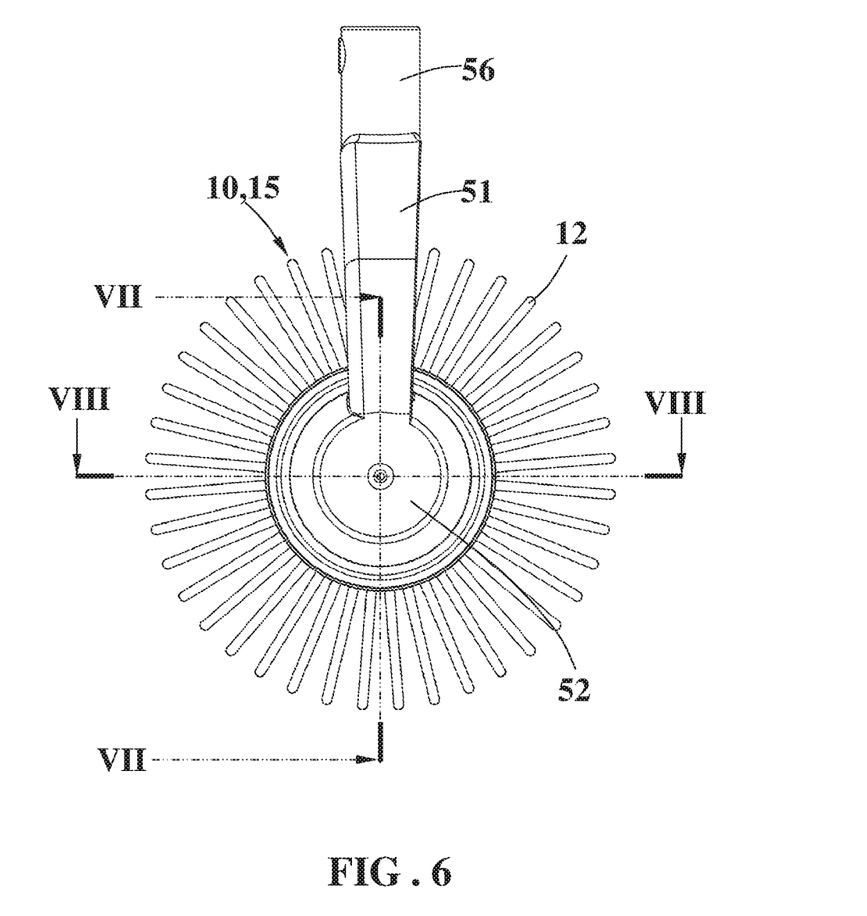
FIG. 6 is a right side view of the particle collecting device of the present invention.

As shown in FIGS. 1, 5 and 6, the covers 30 are pivoted about the shafts 40 so that the cage 10 is rotatable. The chamber 15 rolls on the ground and the particles such as seeds, fruits, beans, plastic balls or the like are collected in the chamber 15 by the resilient wires 12.

Figure 9:
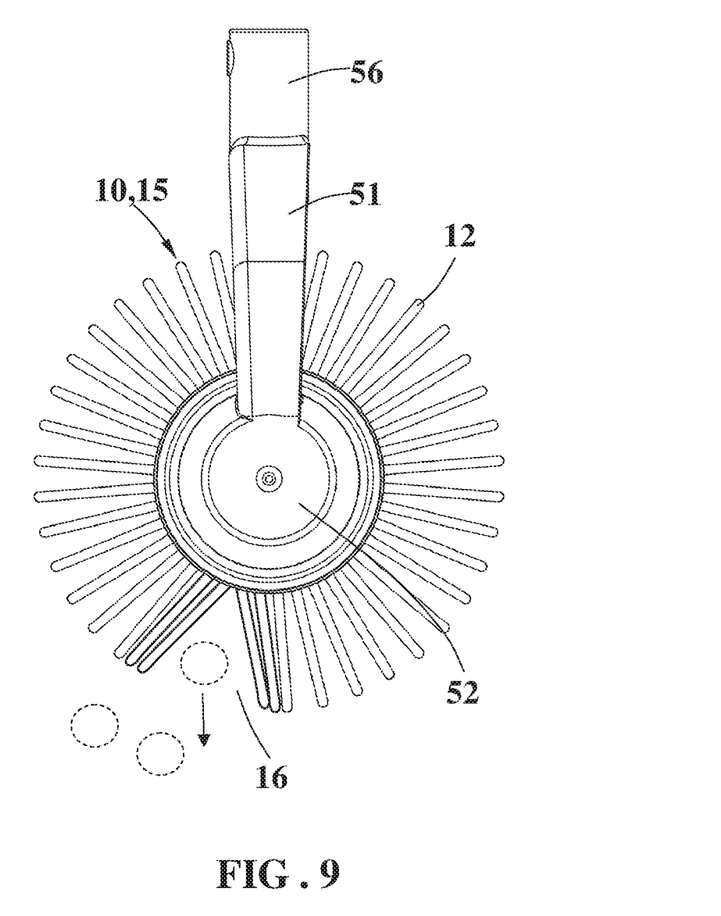
FIG. 9 is the right side view of the particle collecting device of the present invention and shows particles are being removed from the cage.

As shown in FIG. 9, when removing the particles in the chamber 15, the adjacent resilient wires 12 are pulled apart from each other to form an opening 16 that is sized to allow the particles to leave from the opening 16.

While we have shown and described the embodiment in accordance with the present invention, it should be clear to those skilled in the art that further embodiments may be made without departing from the scope of the present invention.

What is claimed is:

1. A particle connecting device comprising:

a cage having multiple connection units, each connection unit having two end pieces and multiple resilient wires that are arranged side by side, each end piece having a positioning hole, each end of the resilient wires of each connection unit being connected to one said end piece;

two hubs each having a disc which has an axial hole defined centrally therethrough, multiple pivotal portions formed on outside of the disc and located surrounding the axial hole, each pivotal portion having a hook which is resiliently and radially movable relative to the disc, each pivotal portion inserted into the positioning hole of one said end piece of one said connection unit, the end pieces connected to the two hubs, the resilient wires being arranged to form a chamber;

two covers each having a body which has a shaft hole defined centrally therethrough, multiple fixing holes defined in the body and located surrounding the shaft hole, the pivotal portions of the hubs respectively inserted into the fixing holes, each of the hooks hooking a periphery of the fixing hole corresponding thereto, the bodies covering up the end pieces;

a shaft extending through the axial hole of the disc and the shaft hole of the body corresponding thereto, the shaft including a flange formed on a first end thereof which is located opposite to the hub corresponding thereto and engaged with an inside of the hub, a receiving recess defined in a second end of each shaft, and a first locking hole defined centrally in the shaft, and a handle having a handle body and two lugs which are formed on two ends of the handle body, a handle extension extending from a central portion of the handle, the two lugs located on two respective outsides of the covers, each lug having a pivot extending from an inside thereof which faces the cover, the pivot inserted into the receiving recess of the shaft corresponding thereto, the pivot having a second locking hole defined centrally therein, the second locking hole of the pivot located corresponding to the first locking hole of the shaft, a locking member extending through the first and second locking holes to connect the lug to the shaft.

2. The particle connecting device as claimed in claim 1, wherein each of the end pieces is a fan-shaped piece, and the end pieces are assembled to the hubs side-by-side.

3. The particle connecting device as claimed in claim 1, wherein the disc of each hub includes a tubular portion extending from the outside thereof, and the axial hole of the hub extends through the tubular portion.

4. The particle connecting device as claimed in claim 3, wherein the body of each cover includes a first stepped portion and a second stepped portion formed on an outside thereof, an outer diameter of the second stepped portion is smaller than that of the first stepped portion, the shaft hole of the body extends through respective centers of the first and second stepped portions, and the first stepped portion is engaged with the tubular portion of the corresponding hub to connect the body to the hub.

5. The particle connecting device as claimed in claim 4, wherein each of the lugs of the handle has a groove defined in the inside thereof, and the groove is engaged with the second stepped portion of the cover corresponding thereto.

6. The particle connecting device as claimed in claim 1, wherein each of the covers has a peripheral portion which is connected to an outer periphery of the body, and the peripheral portion covers a periphery of the end piece and the ends of the resilient wires of each of the connection units.

7. The particle connecting device as claimed in claim 1, wherein the shaft includes at least one restriction recess which is parallel to the first locking hole of the shaft, a pin extends from a distal end of the pivot of the lug corresponding thereto, and the pin is inserted into the restriction recess.

\* \* \* \* \*